United States Patent
Nemavat et al.

(10) Patent No.: US 8,837,478 B1
(45) Date of Patent: Sep. 16, 2014

(54) SYSTEM AND METHOD FOR INTERFERENCE PROTECTION IN DOWNLINK MULTI-USER MULTIPLE-INPUT, MULTIPLE-OUTPUT COMMUNICATION

(75) Inventors: Pradeep Jugraj Nemavat, Maharashtra (IN); Sandesh Goel, Noida (IN)

(73) Assignee: Marvell International Ltd., Hamilton (BM)

( * ) Notice: Subject to any disclaimer, the term of this patent is extended or adjusted under 35 U.S.C. 154(b) by 261 days.

(21) Appl. No.: 13/189,087

(22) Filed: Jul. 22, 2011

Related U.S. Application Data

(60) Provisional application No. 61/367,214, filed on Jul. 23, 2010.

(51) Int. Cl.
| | | |
|---|---|---|
| H04L 12/18 | (2006.01) | |
| H04L 12/721 | (2013.01) | |
| H04L 29/06 | (2006.01) | |

(52) U.S. Cl.
CPC ............. *H04L 12/1868* (2013.01); *H04L 69/22* (2013.01); *H04L 45/34* (2013.01)
USPC ........... 370/390; 370/255; 370/329; 370/338; 370/432

(58) Field of Classification Search
CPC ... H04L 1/1812; H04L 1/1854; H04L 1/1867; H04L 12/1868; H04L 12/189; H04L 45/00; H04L 45/34; H04L 45/16; H04L 69/22; H04L 68/00; H04L 2001/0093
USPC .......... 370/254, 255, 328, 329, 338, 390, 432
See application file for complete search history.

(56) References Cited

U.S. PATENT DOCUMENTS

| | | | | |
|---|---|---|---|---|
| 7,400,888 | B2 * | 7/2008 | Smith et al. ................. | 455/452.1 |
| 7,792,138 | B2 * | 9/2010 | Hahm et al. .................. | 370/462 |
| 7,826,472 | B2 * | 11/2010 | Kappes et al. ................ | 370/445 |
| 7,876,704 | B1 * | 1/2011 | Bims et al. .................... | 370/254 |
| 8,411,608 | B2 * | 4/2013 | Chandra et al. ............... | 370/312 |
| 8,582,526 | B2 * | 11/2013 | Barghi et al. ................. | 370/330 |
| 2002/0150095 | A1 * | 10/2002 | Sherman ....................... | 370/389 |
| 2003/0227934 | A1 * | 12/2003 | White et al. .................. | 370/432 |
| 2004/0246935 | A1 * | 12/2004 | Joshi et al. .................... | 370/338 |
| 2006/0072530 | A1 * | 4/2006 | Strutt et al. ................... | 370/338 |
| 2007/0195769 | A1 * | 8/2007 | Lin ............................... | 370/390 |
| 2008/0031248 | A1 * | 2/2008 | Vilei et al. .................... | 370/390 |
| 2008/0240097 | A1 * | 10/2008 | Kim et al. ..................... | 370/390 |
| 2009/0201901 | A1 * | 8/2009 | Morioka et al. ............... | 370/338 |
| 2010/0074198 | A1 * | 3/2010 | Morioka ....................... | 370/329 |
| 2011/0110293 | A1 * | 5/2011 | Hart et al. ..................... | 370/328 |
| 2011/0150004 | A1 * | 6/2011 | Denteneer et al. ............ | 370/476 |
| 2011/0176627 | A1 * | 7/2011 | Wu et al. ....................... | 375/260 |
| 2011/0317630 | A1 * | 12/2011 | Zhu et al. ...................... | 370/329 |
| 2012/0076073 | A1 * | 3/2012 | Merlin et al. ................. | 370/328 |

* cited by examiner

*Primary Examiner* — Andrew Chriss
*Assistant Examiner* — Rasha Fayed

(57) ABSTRACT

An access point includes a packet generation module, a packet detection module, and a downlink control module. The packet generation module is configured to generate a multi-user request-to-send (MU-RTS) packet for transmission to each of N remote nodes, wherein N is an integer greater than one. The packet detection module is configured to detect clear-to-send (CTS) packets received from ones of the N remote nodes. The downlink control module is configured to control a downlink to M of the N remote nodes after M CTS packets are detected, wherein M is based on the MU-RTS packet, and wherein M is an integer less than or equal to N.

25 Claims, 6 Drawing Sheets

SYSTEM AND METHOD FOR INTERFERENCE PROTECTION IN DOWNLINK MULTI-USER MULTIPLE-INPUT, MULTIPLE-OUTPUT COMMUNICATION

CROSS-REFERENCE TO RELATED APPLICATIONS

This disclosure claims the benefit of U.S. Provisional Application No. 61/367,214, filed on Jul. 23, 2010. The disclosure of the above application is incorporated herein by reference in its entirety.

FIELD

The present disclosure relates to communication systems and more particularly to a system and method for interference protection in downlink (DL) multi-user multiple-input, multiple-output (MU-MIMO) communication.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless communication systems may transmit control packets prior to transmitting data packets in order to prevent interference due to frame collision. For example, frame collision may occur as a result of hidden nodes. The control packets may be request-to-send (RTS) and clear-to-send (CTS) packets. A source node wishing to send a data packet may first transmit the RTS packet to a destination node. The destination node may then transmit the CTS packet back to the source node to initiate data packet transmission. Conventional RTS and CTS packets are designed to prevent transmission interference between two stations.

Many wireless communication systems, however, use multiple antennas and are therefore modeled as multiple-input, multiple-output (MIMO) systems. MIMO systems can increase throughput by transmitting multiple streams over multiple transmit antennas. Examples of MIMO wireless communication systems (hereinafter MIMO systems) include wireless fidelity (WiFi) systems, Worldwide Interoperability for Microwave Access (WiMAX) systems, Long Term Evolution (LTE) systems, and so on. Conventional RTS and CTS packets, however, may not work in MIMO systems.

SUMMARY

An access point includes a packet generation module, a packet detection module, and a downlink control module. The packet generation module is configured to generate a multi-user request-to-send (MU-RTS) packet for transmission to each of N remote nodes, wherein N is an integer greater than one. The packet detection module is configured to detect clear-to-send (CTS) packets received from ones of the N remote nodes. The downlink control module is configured to control a downlink to M of the N remote nodes after M CTS packets are detected, wherein M is based on the MU-RTS packet, and wherein M is an integer less than or equal to N.

A method includes generating a multi-user request-to-send (MU-RTS) packet for transmission to each of N remote nodes, wherein N is an integer greater than one, detecting clear-to-send (CTS) packets received from ones of the N remote nodes, and controlling a downlink to M of the N remote nodes after M CTS packets are detected, wherein M is based on the MU-RTS packet, and wherein M is an integer less than or equal to N.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
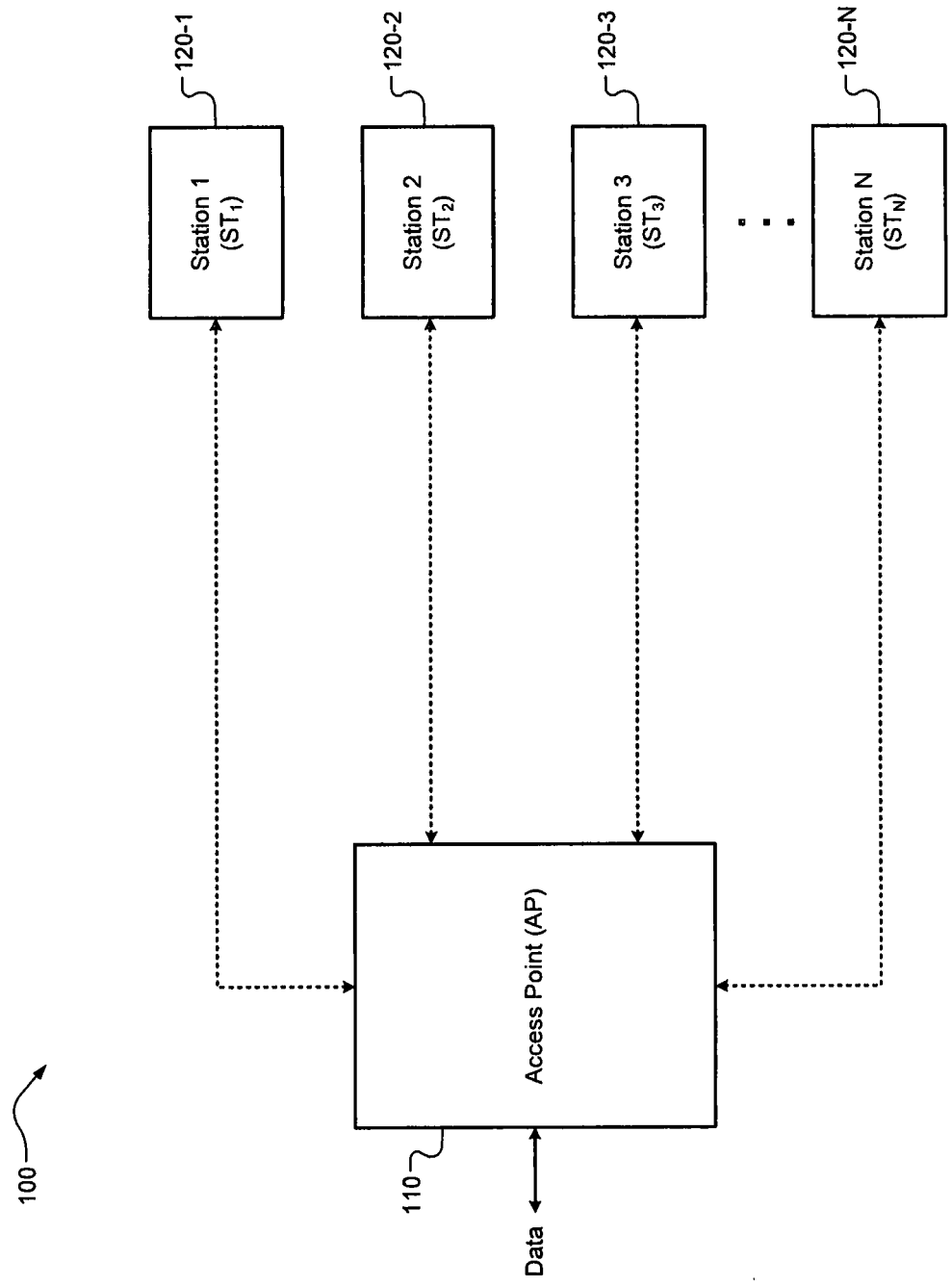
FIG. 1 is a functional block diagram of an example communication system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module refers to, is part of, or includes an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Conventional multiple-input, multiple output (MIMO) communication systems are directed to communication with single nodes (i.e., stations) having multiple receive antennas. Multi-user MIMO (MU-MIMO) communication systems, on the other hand, are directed to communication with multiple stations during a period. More specifically, MU-MIMO communication systems are capable of communication with a plurality of stations (and thus a plurality of users) at the same time. MU-MIMO systems, therefore, are capable of transmitting more data during a period than other similar communication systems.

Ready-to-send (RTS) and clear-to-send (CTS) control packets are typically transmitted by an access point (AP) and a station, respectively, prior to initializing a downlink (DL) communication. A DL communication may represent a flow of information from an AP to one or more stations. Conventional RTS and CTS packets, however, may not work in MU-MIMO communication systems. For example, interference due to frame collision may occur when multiple stations are transmitting CTS packets during a period. In addition, a first CTS packet received by the AP may cause incorrect setting of a network allocation vector (NAV) for all stations other than the transmitter of CTS in the MU-MIMO system.

Accordingly, a system and method for interference protection in DL MU-MIMO communication are presented. The system and method may generate an RTS packet for transmission from an AP to each of N remote nodes (N>1). For example only, N may equal four. These remote nodes may also be referred to as stations. In addition, the RTS packet may also be referred to as a multi-user RTS (MU-RTS) packet. The MU-RTS packet may have a fixed length or a variable length. The fixed length may be based on the number of stations (N). The variable length, on the other hand, may be based on a number of addressed stations M for the DL (M≤N). The fixed length MU-RTS packet, therefore, may provide for faster processing after reception while having longer transmission times. The fixed length MU-RTS packet may be processed faster because each station has an assigned field within the packet. In contrast, the variable length MU-RTS packet may provide for shorter transmission times while having slower (i.e., more complex) processing after reception. The variable length MU-RTS packet may take longer to process because each station may have to determine whether or not it is addressed.

In response to receiving the MU-RTS packet, the M of the N stations may transmit a CTS packet back to the AP. A first of the M of the N stations may begin transmitting its CTS packet a predetermined short interframe space (SIFS) interval after receiving the MU-RTS packet. Thereafter, a remainder of the M of the N stations may sequentially transmit their CTS packets according to an order within the MU-RTS packet with predetermined short interframe space (SIFS) intervals between each of the CTS packet transmissions. The predetermined SIFS intervals may be defined by one or more of the IEEE 802.11 standards. For example only, the predetermined SIFS intervals may be 10 microseconds. The system and method may then detect the M CTS packets received by the AP. After the M CTS packets are received, the system and method may initialize a DL between the AP and the M of the N stations. The system and method may then begin transmitting data to the M of the N stations. For example, each of the M stations may receive different data packets during the transmission period. Some or all of the data packets, however, may be the same.

Referring now to FIG. 1, an example communication system 100 includes an AP 110 and N stations $ST_1$ 120-1, $ST_2$ 120-2, $ST_3$ 120-3 . . . $ST_N$ 120-N (collectively referred to as stations 120, and N>1). The AP 110 may communicate with each of the N stations 120. The AP 110 may initialize a DL between itself and M addressed ones of the N stations 120. After DL initialization, the AP 110 may transmit data packets to the M of the N stations 120. The data packets transmitted to the M of the N stations 120 may be different. In addition, the data packets may be transmitted to the M of the N stations 120 during a single period.

Figure 2:
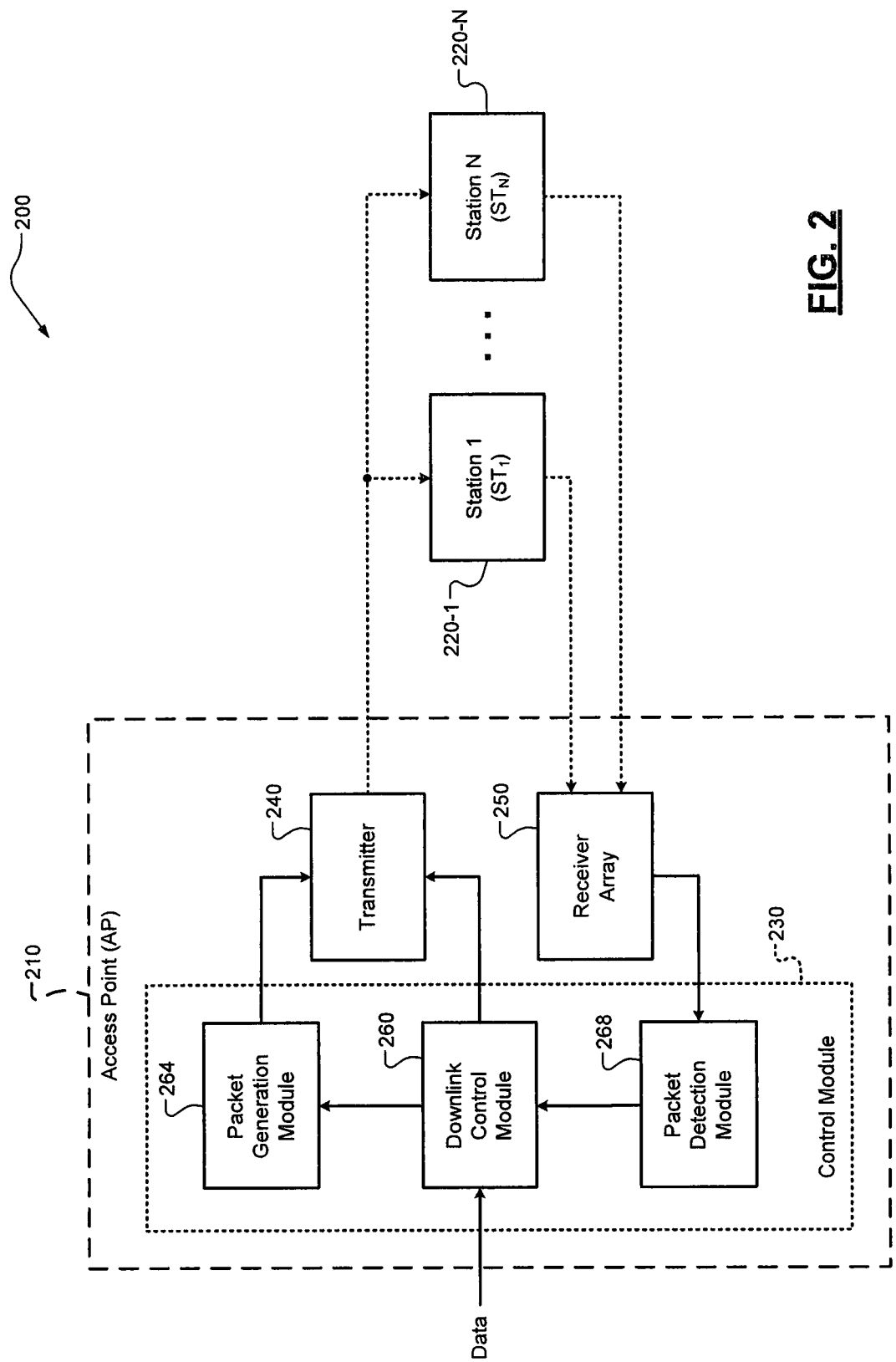
FIG. 2 is a functional block diagram of an example access point (AP) control system according to one implementation of the present disclosure.

Referring now to FIG. 2, an example communication system 200 includes an AP 210 and N stations $ST_1$ 220-1 . . . $ST_N$ 220-N (collectively referred to as stations 220, and N>1). For example only, N may equal four. The AP 210 may further include a control module 230, a transmitter 240, and a receiver array 250. The control module 230 may further include a downlink control module 260, a packet generation module 264, and a packet detection module 268. The AP 210 may communicate with each of the N stations 220 via a wireless network. For example, the AP 210 may be compliant with one or more of the IEEE 802.11 standards.

The downlink control module 260 receives data packets for transmission to M of the N stations 220 (M≤N). Before transmitting the data, the downlink control module 260 may initialize a DL between the AP 210 and the M of the N stations 220. The downlink control module 260 may generate a signal to notify the packet generation module 264 to generate a MU-RTS packet.

In response to the signal from the downlink control module 260, the packet generation module 264 may generate the MU-RTS packet. The transmitter 240 receives the generated MU-RTS packet and transmits the MU-RTS packet to the N stations 220. Each of the N stations 220 receives the MU-RTS packet. The MU-RTS packet, however, may include addresses for the M of the N stations 220. The MU-RTS packet may have a fixed length or a variable length (as previously described).

Figure 3A:
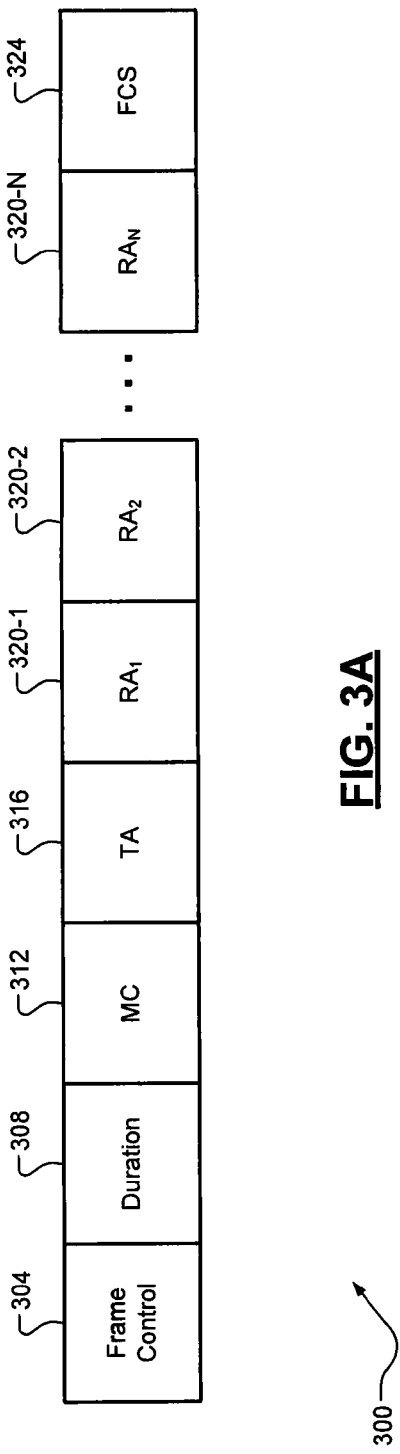
FIG. 3A is a diagram illustrating an example packet definition according to one implementation of the present disclosure.
Figure 3B:
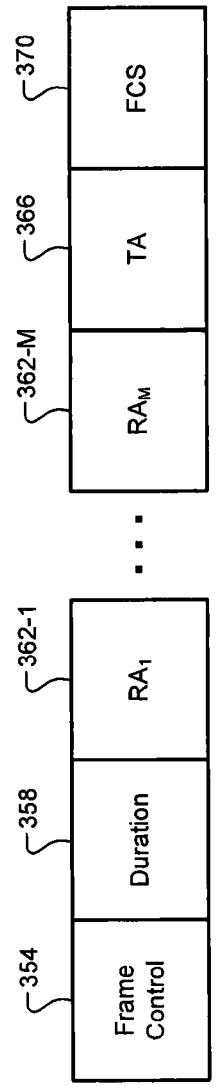
FIG. 3B is a diagram illustrating an example packet definition according to another implementation of the present disclosure.

FIGS. 3A-3B illustrate examples of the fixed and variable length MU-RTS packets 300 and 350, respectively. The fixed length MU-RTS packet 300 may include the following fields: frame control 304, duration 308, multicast (MC) 312, transmitter address (TA) 316, receiver address for first station ($RA_1$) 320-1, receiver address for second station ($RA_2$) 320-2 . . . receiver address for Nth station ($RA_N$) 320-N (collectively receiver address fields 320), and frame check sum (FCS) 324. The duration field 308 may include a time value used to set the NAV for (N-M) of the N stations 220 that are not addressed. Setting the NAV may prevent the (N-M) of the N stations 220 from transmitting for a period.

The TA field 316 may include an address of the transmitter 240. The receiver address fields 320 may include addresses for the N stations 220, respectively. In some implementations, some of the receiver address fields 320 may be empty (i.e., zero) because M<N. However, in situations where M equals N, all receiver address fields 320 of the fixed length MU-RTS packet 300 may be used (i.e., all N stations 220 are addressed). The fixed length MU-RTS packet 300 may provide for more simple processing but longer transmissions (due to longer packet length). For example, processing may be simpler because each of the N stations 220 knows its corresponding field within the MU-RTS packet 300.

The variable size MU-RTS packet 350, on the other hand, may include the following fields: frame control 354, duration 358, receiver address for first station ($RA_1$) 362-1 ... receiver address for Mth station ($RA_M$) 362-M (collectively referred to as receiver address fields 362), transmitter address (TA) 366, and frame check sum (FCS) 370. Similar to the fixed size MU-RTS packet 300, the duration field 358 may set the NAV for (N-M) of the N stations 220 not addressed and the TA field 366 may include the address of the transmitter 240.

While receiver address fields 362 include addresses for M of the N stations 220, receiver address fields for (N-M) of the N stations 220 may be optional. In other words, these receiver address fields may be skipped or omitted from the packet 350 to decrease the packet length. In addition, the MC field (as seen in the fixed size MU-RTS packet 300) may be removed to further decrease the packet length. In contrast, the variable size MU-RTS packet 350 may provide for more complex processing but shorter transmissions (due to a shorter packet length). For example, processing may be more complex because each of the N stations 220 may search the receiver address fields 362 for its corresponding address.

Referring again to FIG. 2, the M of the N stations 220 may then respond by each transmitting a CTS packet back to the AP 210. The M of the N stations 220, however, may transmit the M CTS packets, respectively, according to a schedule to prevent interference due to frame collision. In other words, one CTS packet may be transmitted back to the AP 210 during a given period. MU-RTS addressed stations ignore NAV in CTS from the group of receiver addresses in MU-RTS for a known time (i.e., the time to send CTS from all addressed stations).

Figure 4:
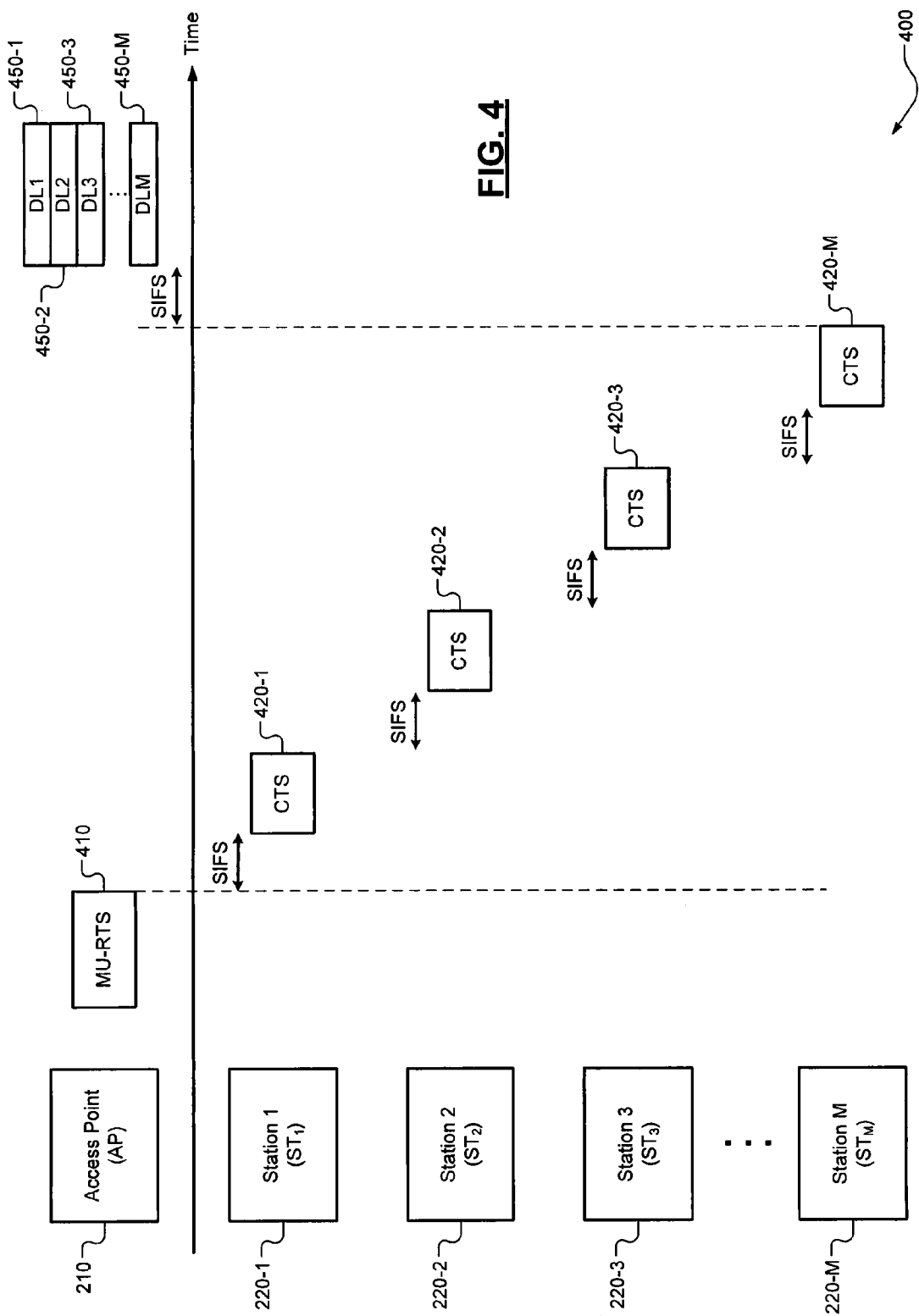
FIG. 4 is a timing diagram illustrating example timings for transmission of control packets before initializing a downlink (DL) according to one implementation of the present disclosure.

FIG. 4 illustrates an example timing diagram 400 for transmission of the CTS packets in response to receiving the MU-RTS packet. For example, in FIG. 4 an MU-RTS packet 410 is addressed to M of the N stations 220 (M≥4). Therefore, each of the M of the N stations 220 responds to the MU-RTS packet by transmitting CTS packets 420-1, 420-2, 420-3 ... 420-M, respectively (collectively CTS packets 420), back to the AP 210. After receiving the M CTS packets, the AP 210 may then transmit data packets DL1 450-1, DL2 450-2, DL3 450-3 ... DLM 450-M to the M of the N stations 220, respectively.

As shown, the CTS packets 420 are transmitted back to the AP 210 sequentially with a SIFS interval between each transmission. The transmission order of the CTS packets 420 may be based on the order of addresses within the MU-RTS packet 410. For example, as shown the order of addresses within the MU-RTS packet 410 and therefore the order of transmission back to the AP 210 is $ST_1$ 220-1, $ST_2$ 220-2, $ST_3$ 220-3, and $ST_M$ 220-M. The M stations may determine timings ($CTS_1$-$CTS_M$) to transmit their corresponding CTS packets back to the AP 210 based on an end of the MU-RTS transmission ($MU\_RTS_{END}$), the SIFS, and transmission time ($CTS_{TX}$) for the CTS packets. For example, as shown the transmission times $CTS_1$-$CTS_M$ may be determined as follows:

$$CTS_1 = MU\text{-}RTS_{END} + SIFS; \qquad ST_1:$$

$$CTS_2 = MU\text{-}RTS_{END} + SIFS + CTS_{TX} + SIFS; \qquad ST_2:$$

$$CTS_3 = MU\text{-}RTS_{END} + SIFS + 2 \times (CTS_{TX} + SIFS); \text{ and} \qquad ST_3:$$

$$CTS_M = MU\text{-}RTS_{END} + SIFS + M \times (CTS_{TX} + SIFS). \qquad ST_M:$$

Referring again to FIG. 2, the receiver array 250 receives the M CTS packets from the M of the N stations 220, respectively. The receiver array 250 may include a plurality of antennas for receiving a plurality of data streams, respectively. The packet detection module 268 detects when the M CTS packets have been received. After receiving the M CTS packets, the packet detection module 268 may generate a signal to notify the downlink control module 260 that DL is initialized and transmission of the data packets may begin. The downlink control module 260 may then control the transmitter 240 to transmit the data packets to corresponding ones of the M of the N stations 220.

However, when less than M CTS packets have been received after a predetermined period, the downlink control module 260 may either (i) proceed with the DL and data packet transmission for less than the M stations or (ii) initialize transmission of a contention free end (CF-END) packet to all of the N stations 220 to reset the NAV of each of the N stations. For example, when X CTS packets are detected (X<M), the packet detection module 268 may generate another signal to notify the downlink control module 260 that the DL is initialized (for less than the M of the N stations 220) and transmission of data packets to the X of the N stations 220 may begin. The downlink control module 260 may then control the transmitter 240 to transmit the data packets to corresponding ones of the X of the N stations 220. In addition, less than M CTS packets may be received when one or more of the M of the N stations 220 are non-MU stations (i.e., legacy stations). The MU-RTS packet may set the NAV for any non-MU stations.

Upon receipt of the data packets, the X or M of the N stations 220 may transmit acknowledgement (ACK) packets back to the AP 210. For example, the X or M ACK packets may be received by the receiver array 250 and detected by the packet detection module 268. After receiving the X or M ACK packets, the downlink control module 260 may control the transmitter 240 to transmit a CF-END packet to all of the N stations 220 to reset the NAV of each of the N stations 220. A new DL may then be initiated based on data packets to be transmitted.

Figure 5A:
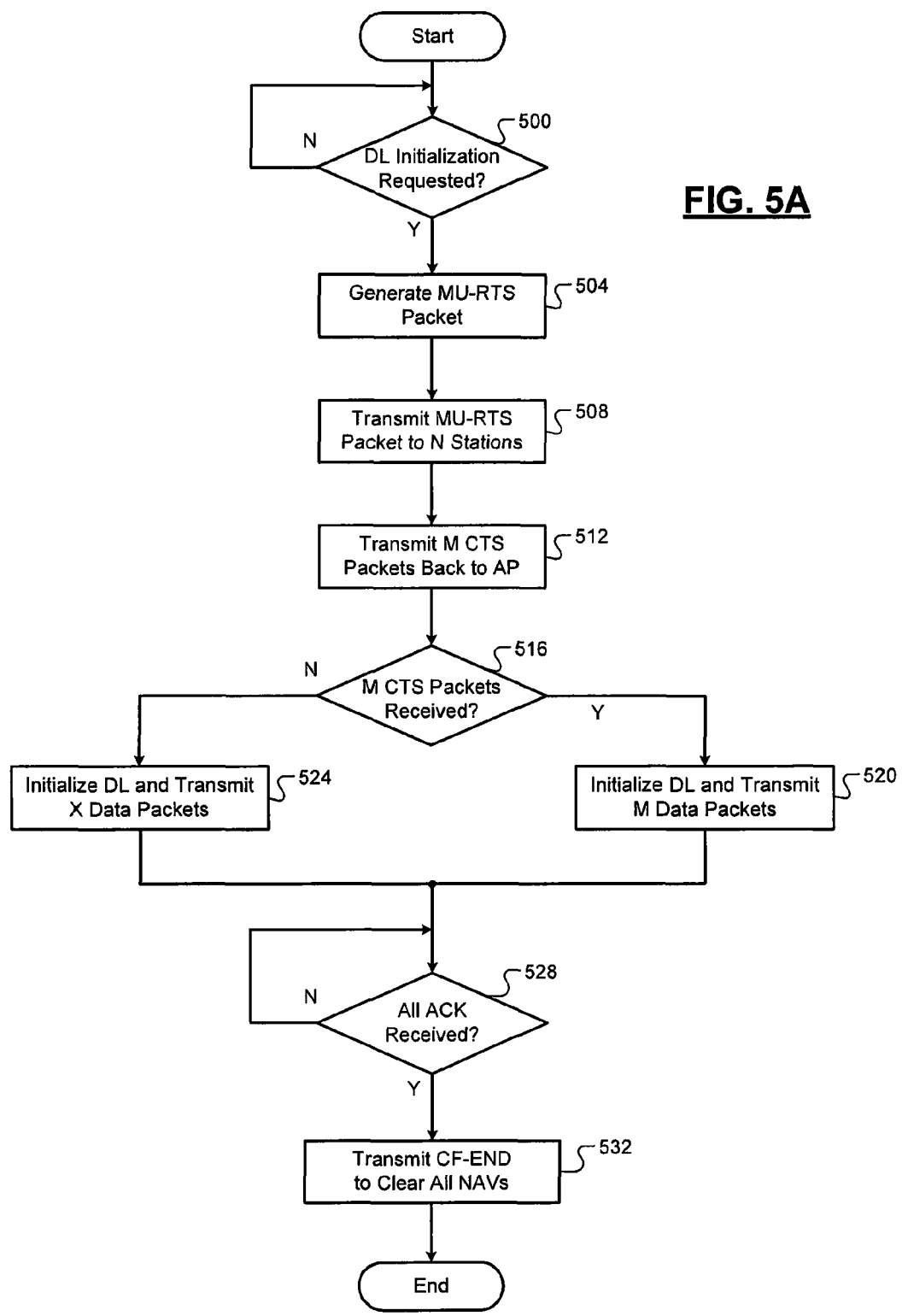
FIG. 5A is a flow diagram illustrating an example method for interference protection in DL multi-user multiple-input, multiple-output (MU-MIMO) communication systems according to one implementation of the present disclosure.

Referring now to FIG. 5A, an example method for interference protection in DL MU-MIMO communication begins at 500. At 500, the downlink control module 260 determines whether DL initialization is requested. If true, control may proceed to 504. If false, control may return to 500. At 504, the packet generation module 264 generates an MU-RTS packet. At 508, the transmitter 240 transmits the MU-RTS packet to the N stations 220. At 512, M of the N stations transmit a CTS packet based on the MU-RTS packet.

At 516, the packet detection module 268 determines whether the M CTS packets have been received (e.g., via receiver array 250). If true, control may proceed to 520. If false, control may proceed to 524. At 520, the downlink control module 260 initializes the DL between the AP 210 and the M of the N stations 220. The AP 210 may then transmit M data packets to the M of the N stations 220, respectively. Control may then proceed to 528. At 524, the downlink control module 260 may initialize the DL between the AP 210 and X of the N stations 220, where X is a number of CTS packets received by the AP 210. The AP 210 may then transmit X data packets to the X of the N stations 220, respectively. Control may then proceed to 528.

The M or X of the N stations 220 receiving the data packets may then transmit M or X acknowledgement (ACK) packets, respectively, back to the AP 210. At 528, the AP 210 may determine whether the M or X ACK packets have been received. If true, control may proceed to 532. If false, control may return to 528. At 532, the AP 210 may transmit a CF-END packet to reset the NAV of each of the N stations 220. Control may then end.

Figure 5B:
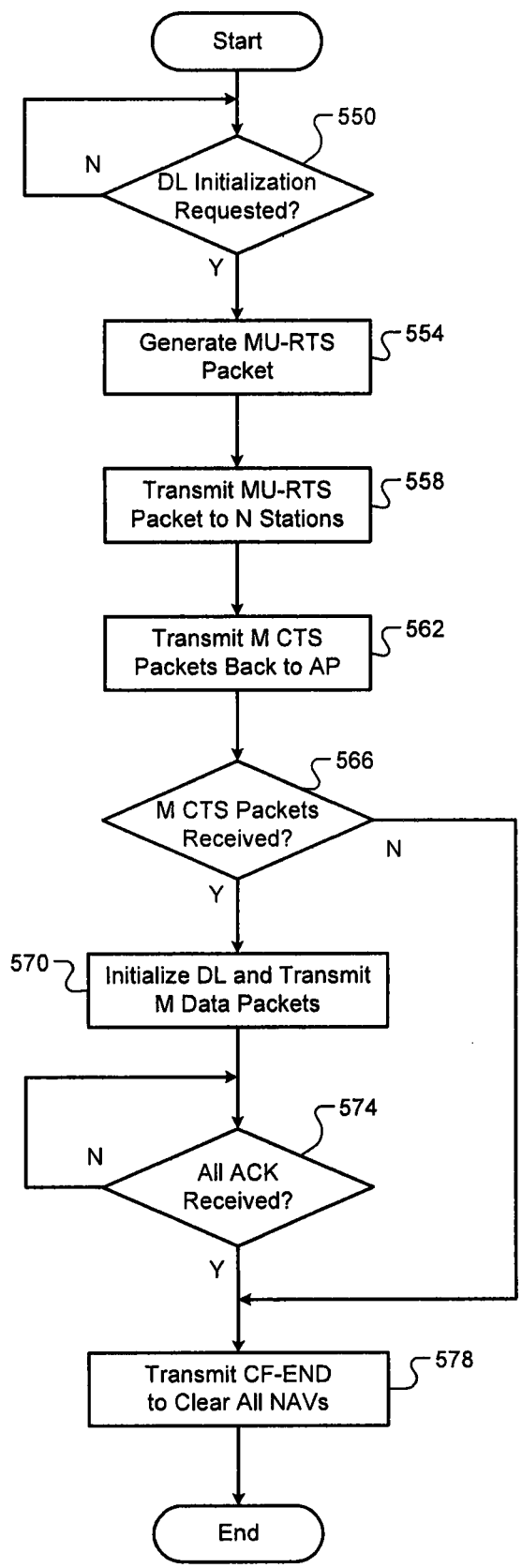
FIG. 5B is a flow diagram illustrating an example method for interference protection in DL MU-MIMO communication systems according to another implementation of the present disclosure.

Referring now to FIG. 5B, another example method for interference protection in DL MU-MIMO communication begins at 550. At 550, the downlink control module 260 determines whether DL initialization is requested. If true, control may proceed to 554. If false, control may return to 550. At 554, the packet generation module 264 generates an MU-RTS packet. At 558, the transmitter 240 transmits the MU-RTS packet to the N stations 220. At 562, M of the N stations transmit a CTS packet based on the MU-RTS packet.

At 566, the packet detection module 268 determines whether the M CTS packets have been received (e.g., via receiver array 250). If true, control may proceed to 570. If false, control may proceed to 578. At 570, the downlink control module 260 initializes the DL between the AP 210 and the M of the N stations 220. The AP 210 may then transmit M data packets to the M of the N stations 220, respectively.

The M of the N stations 220 receiving the data packets may then transmit M acknowledgement (ACK) packets, respectively, back to the AP 210. At 574, the AP 210 may determine whether the M ACK packets have been received. If true, control may proceed to 578. If false, control may return to 574. At 578, the AP 210 may transmit a CF-END packet to reset the NAV of each of the N stations 220. Control may then end.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An access point comprising:
   a packet generation module configured to generate a multi-user request-to-send packet for transmission to each of N remote nodes,
   wherein
      the multi-user request-to-send packet includes a plurality of addresses,
      each of the plurality of addresses is for a respective one of M of the N remote nodes,
      N is an integer greater than one, and
      M is an integer (i) less than or equal to N, and (ii) greater than or equal to 1;
   a packet detection module configured to detect clear-to-send packets received from ones of the N remote nodes; and
   a downlink control module configured to, based on the plurality of addresses, control a downlink to the M of the N remote nodes after M clear-to-send packets are detected respectively from the M of the N remote nodes,
   wherein
      a transmission of a first one of the clear-to-send packets begins a short interframe space period after receiving the multi-user request-to-send packet,
      transmissions of a remainder of the clear-to-send packets are sequential, and
      start times of each of the transmissions of the remainder of the clear-to-send packets is based on
         a transmission end time of the multi-user request-to-send packet,
         the short interframe space period, and
         a product of (i) a number of previously transmitted clear-to-send packets, and (ii) a sum of an amount of time to transmit one of the clear-to-send packets and the short interframe space period.

2. The access point of claim 1, wherein the multi-user request-to-send packet has a variable length.

3. The access point of claim 2, wherein the variable length is based on M.

4. The access point of claim 1, wherein the multi-user request-to-send packet has a predetermined length.

5. The access point of claim 4, wherein the predetermined length is based on N.

6. The access point of claim 1, wherein N equals four.

7. The access point of claim 1, wherein each of the transmissions of the remainder of the clear-to-send packets are separated by a sum of the short interframe space period and a transmission time for a clear-to-send packet.

8. The access point of claim 1, wherein:
   the multi-user request-to-send packet includes a duration field; and
   the duration field is used to set a network allocation vector for N-M of the N remote nodes.

9. An access point comprising:
   a packet generation module configured to generate a multi-user request-to-send packet for transmission to each of N remote nodes,
   wherein
      the multi-user request-to-send packet includes a plurality of addresses,
      each of the plurality of addresses is for a respective one of M of the N remote nodes,
      N is an integer greater than one, and
      M is an integer (i) less than or equal to N, and (ii) greater than or equal to 1;
   a packet detection module configured to detect clear-to-send packets received from ones of the N remote nodes; and
   a downlink control module configured to, based on the plurality of addresses, control a downlink to the M of the N remote nodes after M clear-to-send packets are detected respectively from the M of the N remote nodes,
   wherein
      the multi-user request-to-send packet includes a duration field,
      the duration field is used to set a network allocation vector for N-M of the N remote nodes,
      the N remote nodes ignore network allocation vector information in the clear-to-send packets transmitted from the M of the N remote nodes for a predetermined period,
      the clear-to-send packets are sent by the M of the N nodes during the predetermined period
      a transmission of a first one of the clear-to-send packets begins a short interframe space period after receiving the multi-user request-to-send packet,
      transmissions of a remainder of the clear-to-send packets are sequential, and
      start times of each of the transmissions of the remainder of the clear-to-send packets is based on
         a transmission end time of the multi-user request-to-send packet,
         the short interframe space period, and
         a product of (i) a number of previously transmitted clear-to-send packets, and (ii) a sum of an amount of time to transmit one of the clear-to-send packets and the short interframe space period.

10. The access point of claim 1, wherein the downlink control module is configured to initiate transmission of data packets to the M of the N remote nodes, respectively, the short interframe space after the M clear-to-send packets are detected.

11. The access point of claim 1, wherein:
in response to receiving X clear-to-send packets instead of M clear-to-send packets, the downlink control module is configured to initiate transmission of data packets to X of the N remote nodes instead of initiating transmission of data packets to the M of the N remote nodes;
the downlink control module is configured to transmit the data packets to the X of the N remote nodes a predetermined period after the multi-user request-to-send packet was received;
X is a number of clear-to-send packets received during the predetermined period; and
X is an integer greater than zero and less than M.

12. The access point of claim 10, wherein each of the M of the N remote nodes transmits an acknowledgement packet after receiving a data packet.

13. The access point of claim 12, wherein:
the downlink control module is configured to initiate transmission of a contention free end packet to each of the N remote nodes after the M acknowledgement packets are received; and
the contention free end packet resets a network allocation vector for each of the N remote nodes.

14. The access point of claim 13, wherein the downlink control module is configured to initiate transmission of the contention free end packet when zero clear-to-send packets have been received within a predetermined period after the multi-user request-to-send packet was received.

15. The access point of claim 13, wherein the downlink control module is configured to initiate transmission of the contention free end packet when greater than zero clear-to-send packets and less than M clear-to-send packets have been received within a predetermined period.

16. A method comprising:
generating a multi-user request-to-send packet for transmission to each of N remote nodes,
wherein
the multi-user request-to-send packet includes a plurality of addresses,
each of the plurality of addresses is for a respective one of M of the N remote nodes,
N is an integer greater than one, and
M is an integer (i) less than or equal to N, and (ii) greater than or equal to 1;
detecting clear-to-send packets received from ones of the N remote nodes; and
based on the plurality of addresses, controlling a downlink to the M of the N remote nodes after M clear-to-send packets are detected respectively from the M of the N remote nodes,
wherein
a transmission of a first one of the clear-to-send packets begins a short interframe space period after receiving the multi-user request-to-send packet,
transmissions of a remainder of the clear-to-send packets are sequential, and
start times of each of the transmissions of the remainder of the clear-to-send packets is based on
a transmission end time of the multi-user request-to-send packet,
the short interframe space period, and
a product of (i) a number of previously transmitted clear-to-send packets, and (ii) a sum of an amount of time to transmit one of the clear-to-send packets and the short interframe space period.

17. The method of claim 16, wherein the multi-user request-to-send packet has a variable length.

18. The method of claim 17, wherein the variable length is based on M.

19. The method of claim 16, wherein the multi-user request-to-send packet has a predetermined length.

20. The method of claim 19, wherein the predetermined length is based on N.

21. The method of claim 19, wherein N equals four.

22. The method of claim 16, wherein each of the transmissions of the remainder of the clear-to-send packets are separated by a sum of the short interframe space period and a transmission time for a clear-to-send packet.

23. The method of claim 16, wherein:
the multi-user request-to-send packet includes a duration field; and
the duration field is used to set a network allocation vector for N-M of the N remote nodes.

24. The access point of claim 1, wherein:
the clear-to-send packets are received at respective time periods and in an order in which the corresponding plurality of addresses were included in the multi-user request-to-send packet; and
consecutive ones of the time periods are separated by respective short interframe space periods.

25. The access point of claim 9, wherein a length of the predetermined period is based on an amount of time for each of the N remote nodes to send a respective clear-to-send packet.

* * * * *